(12) United States Patent
McNeely et al.

(10) Patent No.: US 6,192,924 B1
(45) Date of Patent: Feb. 27, 2001

(54) PILOT OPERATED RELIEF VALVE

(75) Inventors: Michael D. McNeely, Katy; Thomas F. Higgins, Houston, both of TX (US)

(73) Assignee: Tyco Flow Control, Inc., Houston, TX (US)

( * ) Notice: Subject to any disclaimer, the term of this patent is extended or adjusted under 35 U.S.C. 154(b) by 0 days.

(21) Appl. No.: 09/487,745

(22) Filed: Jan. 19, 2000

(51) Int. Cl.[7] .................................................. F16K 17/10
(52) U.S. Cl. ....................... 137/489.5; 137/488; 251/282; 251/335.1
(58) Field of Search ..................... 137/488, 489, 137/489.5; 251/282, 335.2, 335.3, 335.1

(56) References Cited

U.S. PATENT DOCUMENTS

| | | |
|---|---|---|
| 2,649,115 | 8/1953 | Deardorff . |
| 3,294,111 | 12/1966 | Abercrombie . |
| 3,304,951 | 2/1967 | Farris . |
| 3,406,712 | 10/1968 | Weise . |
| 3,414,008 | 12/1968 | Greenwood . |
| 3,512,560 | 5/1970 | Weise . |
| 3,568,706 | 3/1971 | Weise . |
| 3,664,362 | 5/1972 | Weise . |
| 3,726,301 | 4/1973 | Schmidt . |
| 4,172,466 | 10/1979 | Pattarini et al. . |
| 4,355,657 | 10/1982 | Reip . |
| 4,390,041 | 6/1983 | Reip . |
| 5,099,882 | * 3/1992 | Smith, III ............................ 251/282 |
| 5,842,501 | 12/1998 | Powell et al. . |
| 5,941,505 | * 8/1999 | Nagel ................................. 251/335.2 |
| 5,954,086 | * 9/1999 | Ronchi .............................. 251/335.2 |

* cited by examiner

*Primary Examiner*—Gregory L. Huson
*Assistant Examiner*—Ramesh Krishnamurthy
(74) *Attorney, Agent, or Firm*—Browning Bushman

(57) ABSTRACT

A pilot operated safety relief valve (14) in which a pilot valve (32) controls the opening and closing of the main valve member (26). The pilot valve (32) has a spindle valve member (70) between an intermediate dome fluid chamber (52) and an exhaust chamber (54) communicating with exhaust port (52) and exhaust line (38). Spindle valve member (70) has an annular sealing member or membrane (104) having a relatively thin body (105) with opposed beads (106, 108) along inner and outer peripheries of body (105) for sealing between spindle valve member (70) and the adjacent retainer sleeve (94). Any positive backpressure forces from exhaust line (38) are balanced against spindle valve member (70) by annular seal (80) and membrane (104). Membrane (104) is effective for sealing between spindle valve member (70) and retainer sleeve (94) without generation of frictional forces therebetween thereby to permit precise actuation of main valve member (70) within the tolerance of the relieving pressure specified for pilot valve (32).

25 Claims, 4 Drawing Sheets

PILOT OPERATED RELIEF VALVE

FIELD OF THE INVENTION

This invention relates to a pilot operated safety relief valve, and more particularly to such a pilot operated relief valve in which no process fluid of the pressure vessel on which the relief valve is mounted is exhausted to atmosphere through the pilot valve upon actuation of the pilot valve.

BACKGROUND OF THE INVENTION

A so-called snap action pilot valve such as shown in U.S. Pat. No. 3,664,362 dated May 23, 1972, effects a rapid movement to an open position of the valve member for fluid flow to an exhaust port. Upon cracking of the valve member under fluid pressure from a seated position, the valve member snaps to a full open position as a result of the increased area of the valve member exposed to fluid pressure. A small amount of process fluid from the pressure vessel, such as a tank or pipeline, may be vented to atmosphere through the exhaust port. The valve member reseats upon relieving of the fluid pressure in the pressure vessel.

A limitation for such a pilot valve and other snap acting pilots is the inability to vent the pilot valve to a pressure source above atmospheric and maintain specified performance. The venting of process gas to atmosphere in even small quantities is rapidly becoming unacceptable except for common non-toxic and non-hazardous gases. The pilot valve such as shown in the '362 patent is designed to be referenced to atmosphere for adjusting the relieving pressure and the reclosing pressure and therefore must operate by exhausting to atmosphere. Many installations of pilot operated safety relief valves are multiple valves discharging to a common header. Pilot operated safety relief valve such as shown in U.S. Pat. No. 3,664,362, are not effective in these applications due to potential positive backpressure on the pilot exhaust. The result of backpressure is to cause a possible change in the relieving pressure and the reclosing pressure as the backpressure changes. It is desirable to have a pilot valve that is effective even when a backpressure is present in the exhaust line.

Prior attempts to solve this problem have involved balancing the pilot against backpressure by using conventional sealing techniques. Typically an o-ring or similar seal is installed in an operating spindle opposed to the main pilot seat with the effective piston area equal to the seat area of the main pilot seat. Under these conditions the pilot spindle would be balanced so backpressure at the exhaust port would have no effect on the pilot popping pressure or reseating pressure. However, friction in the seal, regardless of design, has rendered this solution impractical. The spindle forces on a pilot can be very small and any friction on the force train between the spring and the pilot seat can cause significant variation of applied force and unpredictability in the relieving and reclosing pressures.

SUMMARY OF THE INVENTION

The present invention is directed to a pilot operated safety relief valve in which the pilot valve includes a spindle or spindle valve member defining the exhaust valve member for controlling fluid flow to and from the exhaust port. The exhaust port is connected to a header or fluid collection container which may also collect fluid from other safety relief valves or devices. The forces acting on the spindle are balanced against backpressure from the exhaust line or exhaust port without any frictional forces being applied. The forces acting on the spindle are balanced against backpressure by creating an upwardly biased piston effect opposite and equal to the force on the main pilot seat. This has been accomplished by installing a relatively thin and flexible elastomeric or polytetrafluoroethylene (Teflon) diaphragm about the spindle valve member. The diaphragm is installed in such a manner that it is in a neutral position (unstretched) when the spindle is in its uppermost position. As spring load is applied to the pilot to establish the seating force the diaphragm is stretched very slightly as the spindle moves down to the main pilot seat. Essentially no friction forces are applied to the spindle. It is also important that the diaphragm conform very well around the small radius of the spindle when in a down seated position so the effective area is essentially the area of the spindle outside diameter above the diaphragm. The diameter can be altered to optimize the balance with the main seat. It is also important that the diaphragm material does not stick or cold vulcanize to the spindle and create resistance to upward movement during the relieving action. In summary, the invention acts to balance the pilot valve at the relieving pressure with backpressure applied to the exhaust port. The relieving pressure must remain within the tolerance specified for the pilot valve.

It is an object of this invention to provide a pilot operated safety relief valve having a pilot valve that is particularly adapted for utilization in a safety relief system in which a backpressure may occur from the exhaust port or exhaust line.

A further object of the invention is to provide such a pilot valve for a pilot operated safety relief valve in which a snap-action spindle valve member controls the flow of fluid to and from the exhaust port with forces resulting from backpressure from the exhaust port being balanced for acting against the spindle valve member.

A further object of the invention is to provide such a spindle valve member for a pilot valve in which frictional forces acting against the spindle valve member form sealing means upon movement of the spindle valve member are substantially eliminated thereby to permit the pilot valve to easily remain in the specified operating tolerance of the pilot valve for relieving and reclosing.

Other objects, features, and advantages of the invention will be apparent from the following specification and drawings.

BRIEF DESCRIPTION OF THE INVENTION

Figure 4:
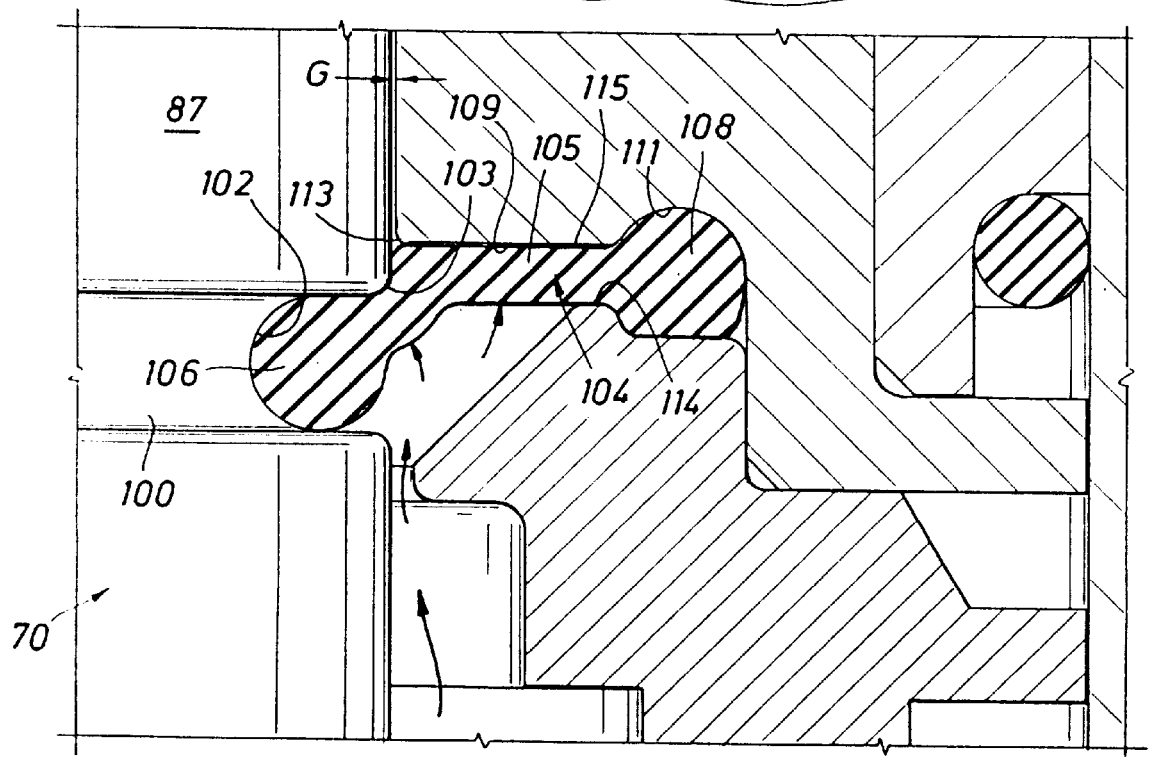
Figure 2:
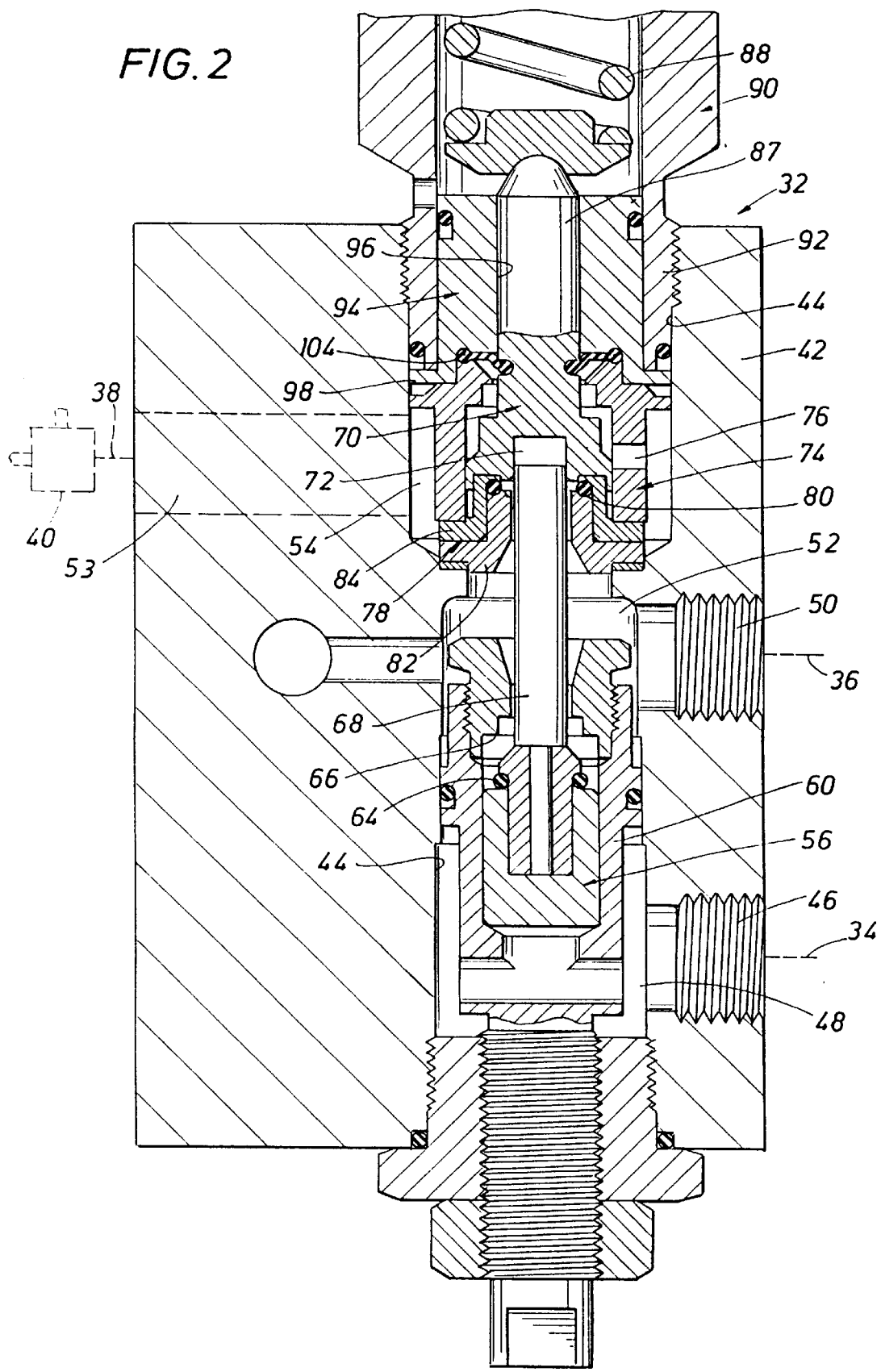
FIG. 2 is a longitudinal sectional view of the pilot valve moved from the safety relief valve with the pilot valve shown in a closed position.
Figure 3:
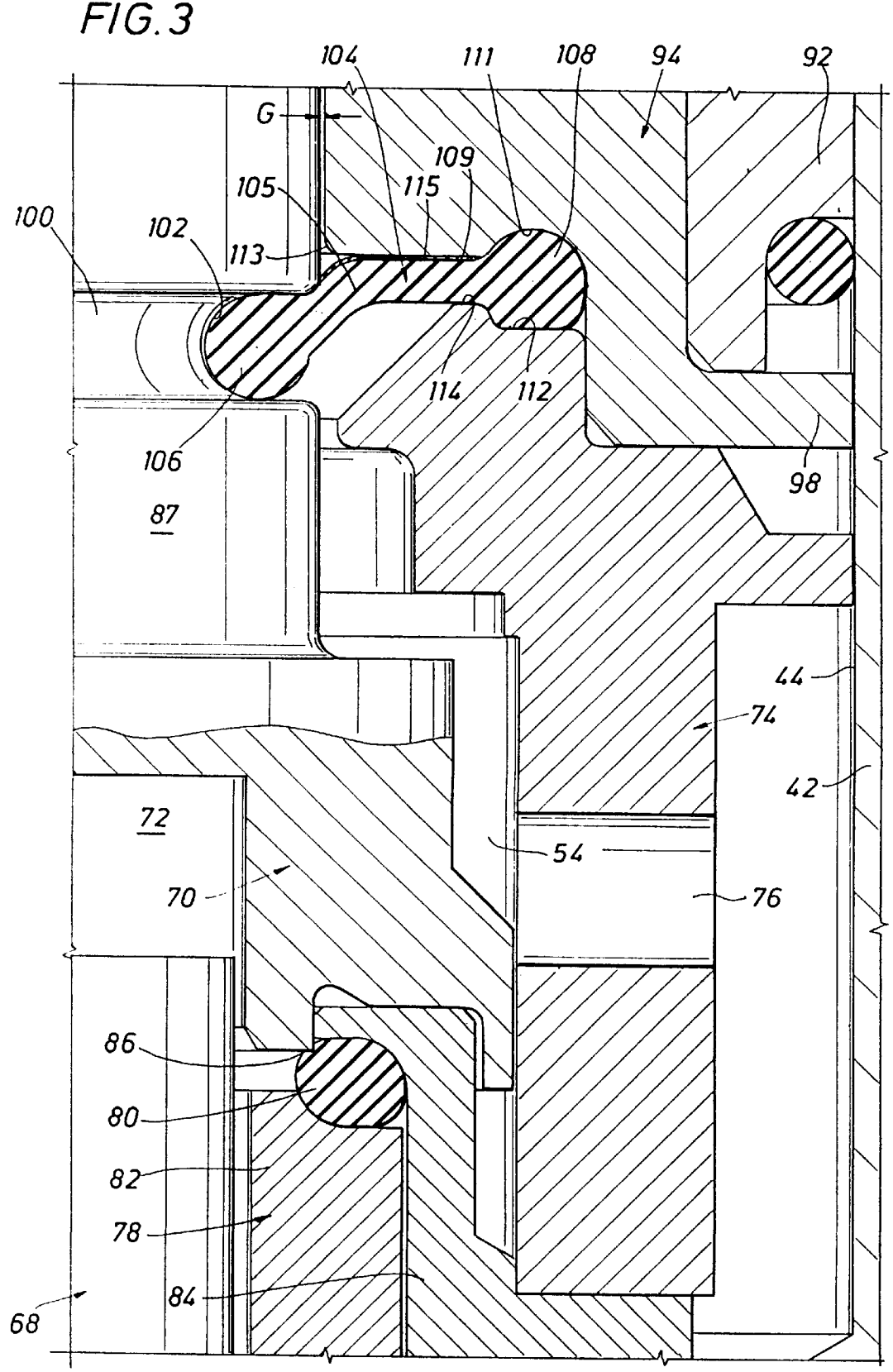
FIG. 3 is an enlarged fragmentary view of FIG. 2 showing the spindle valve member for controlling fluid flow to and from the exhaust port in a closed position and having a membrane type seal about the spindle valve member.
Figure 5:
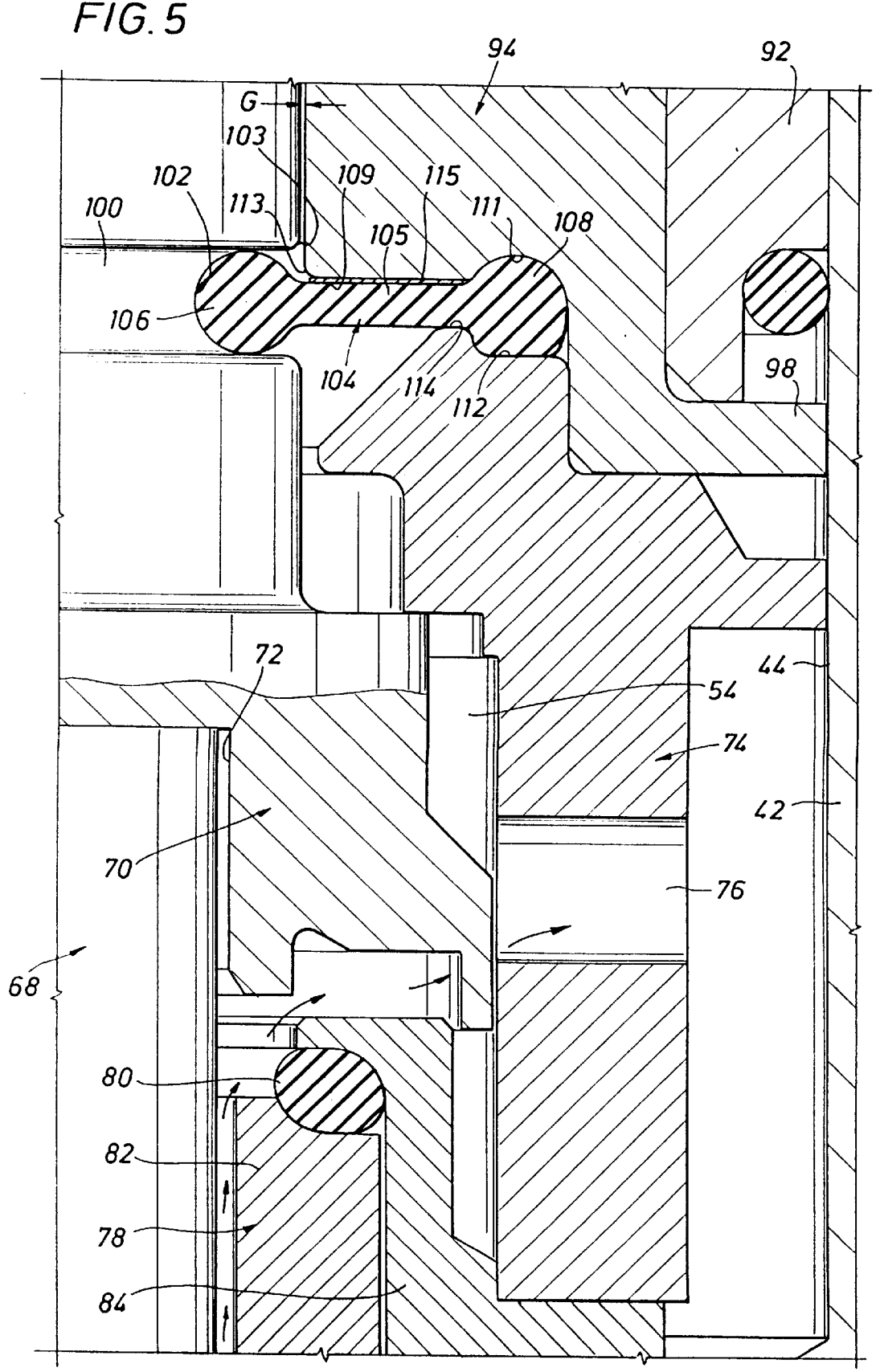

FIG. 4 is an enlarged sectional view of the membrane type seal and spindle valve member shown in FIG. 3 with the membrane type seal exposed to backpressure from the exhaust port prior to opening of the spindle valve member; and FIG. 5 is a longitudinal sectional view of the pilot valve similar to FIG. 3 but showing the spindle valve member in a fully open position and the membrane seal in a neutral unstretched position.

DESCRIPTION OF THE INVENTION

Figure 1:
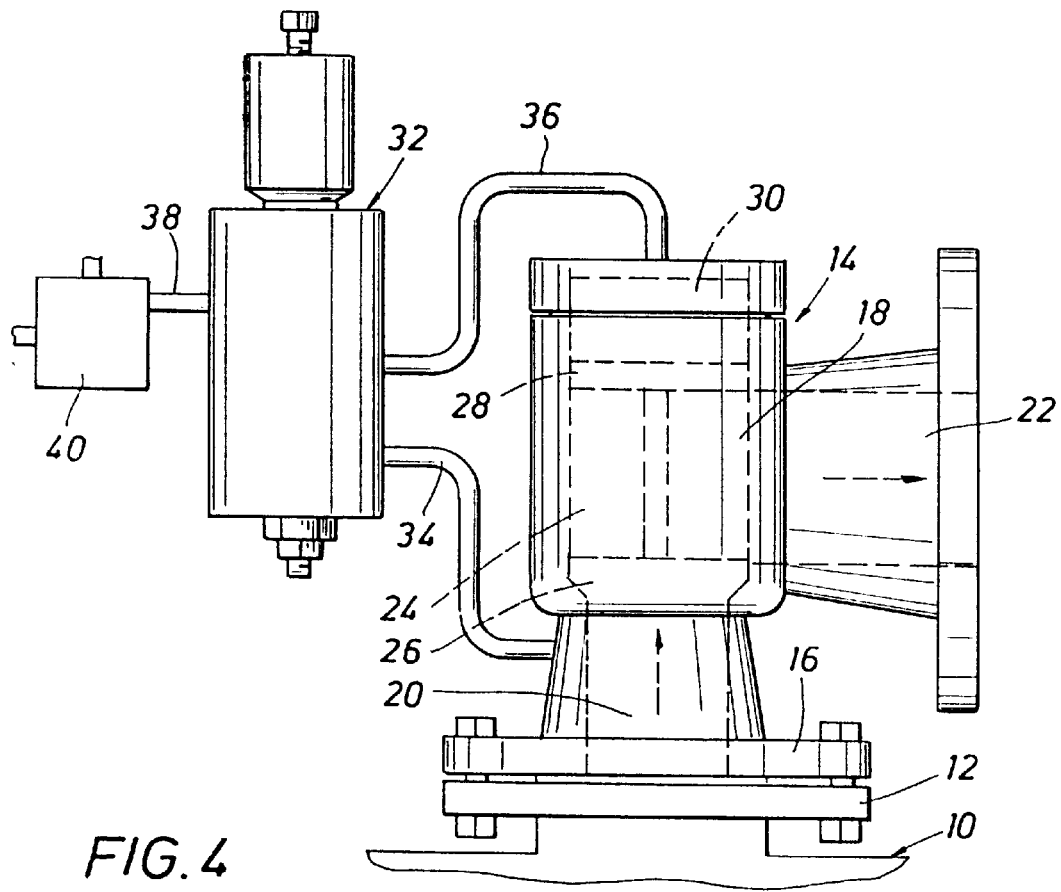
FIG. 1 is an elevational view of a pilot operated safety relief valve mounted on a pressure vessel for pressure relief.

Referring now particularly to FIG. 1, a pressure vessel, such as a tank or pipeline, for example is shown generally at 10 in a safety relief system. Pressure vessel 10 has an upper flange 12 and a main relief valve is shown generally at 14 having a lower flange 16 connected to upper flange 12 of pressure vessel 10. Relief valve 14 has a body 18 including an inlet 20, an outlet 22, and a main valve chamber 24. A main valve member 26 is shown in closed seated position and has a piston actuator 28 in main valve chamber 24 connected thereto. A dome chamber 30 is provided over piston actuator 28 for controlling the opening and closing of main valve member 26.

A pilot valve is shown generally at 32. An inlet sensing line 34 extends to pilot valve 32 from inlet 20. A dome line 36 extends from dome chamber 30 to pilot valve 32. An exhaust line 38 extends from pilot valve 32 to a fluid collection container or member 40 which may be connected to other fluid lines or valves with a possible backpressure occurring in line 38. Thus, pilot valve 32 is particularly adapted for operation with a backpressure in exhaust line 38.

Referring now to FIGS. 2–5, pilot valve 32 has a body 42 with a bore 44 extending therethrough. An inlet port 46 extends between inlet sensing line 34 and an inlet sensing chamber 48. A dome port 50 extends between dome line 36 and an intermediate fluid chamber 52. An exhaust port 53 extends between exhaust line 38 and an exhaust chamber 54. A valve member 56 is shown seated on fixed cage 60. An upper annular seal 64 seals against seat 66 in a full open position of valve member 56. A spacer rod 68 extends from valve member 56.

An upper spindle valve member is shown at 70 having a blind bore 72 receiving the end of rod 68 therein to permit a limited movement of valve member 56 relative to spindle valve member 70. Spindle valve member 70 is mounted within a fixed cage 74 having a port 76 therein. A seat assembly 78 has an annular sealing ring 80 gripped between inner and outer seat retaining members 82, 84. Spindle valve member 70 has a lower annular rim 86 engaging and sealing against sealing ring 80 in the closed position of spindle valve member 70. A spindle 87 of spindle valve member 70 is received within a bore 96 of a retainer sleeve 94. Cage 74 and retainer sleeve 94 form mounting members for spindle valve member 70. A bonnet or spring housing 90 for an adjustable spring 88 has an externally threaded lower end portion 92 threaded within bore 44. A lower end flange 98 of retainer sleeve 94 is gripped against cage 74 by spring housing 90. Adjustable spring 88 is adjustable by a threaded nut (not shown) and urges spindle valve member 70 into seated position on seat assembly 78 under a predetermined seating force. Upon initial cracking of valve member 70, valve member 70 snaps to an open position by exposing the entire lower surface of valve member 70 to the fluid pressure from intermediate chamber 52. Spring 88 is effective in the closing of spindle valve member 70 after valve member 70 is opened under a predetermined high inlet fluid pressure in fluid sensing chamber 48. Upon opening of valve member 70, intermediate fluid chamber 52 is placed in fluid communication with exhaust chamber 54 to exhaust fluid from dome chamber 30 for opening of main relief valve 26.

A positive backpressure in exhaust line 38 and exhaust port 53 may cause a change in the set relieving pressure and reclosing pressure of valve member 70. Thus, it is desirable that the fluid forces acting on spindle valve member 70 be balanced. For this purpose, it is desired that any friction or friction forces generated from movement of the valve member 70 be substantially eliminated. A small gap or clearance G is shown in FIGS. 3–5 between spindle valve member 70 and retainer sleeve 94. Clearance G is normally about 0.0010 inch in thickness but may vary between about 0.0005 inch and 0.0030 inch in thickness. It is desired that gap G be sealed.

Spindle 87 of valve member 70 has an annular groove 100 thereabout defining an arcuate inner surface 102 and an outer upper beveled corner 103. An flexible annular sealing member or membrane 104 extends between valve member 70 and retainer sleeve 94 to seal gap G. Membrane 104 has a thin, pliable body 105. A bulbous inner rim or bead 106 forms the inner periphery of membrane 104 and a bulbous outer rim or bead 108 forms the outer periphery of membrane 104. Retainer sleeve 94 has an indentation at 111 in lower planar surface 109 and cage 74 has an opposed indentation at 112 to form a relatively small width throat or restriction 1 14 therebetween. Bead 108 is gripped between opposed indentations 111, 112 which form a pocket for bead 108. Bead 106 is received within annular groove 100 of valve member 70. Only a relatively small movement of valve member 70 occurs upon movement of valve member 70 between the closed position of valve member 70 in FIG. 3 and the fully open position of valve member 70 in FIG. 5. Thus, only a relatively small stretching of membrane 104 occurs during movement between the fully open position as shown in FIG. 5 and the closed position as shown in FIG. 3.

FIG. 4 shows fluid pressure such as backpressure from exhaust line 38 acting against membrane 104 prior to opening of spindle valve member 70. Membrane 104 is in a neutral or unstretched position in the fully open position of FIG. 5. Thin flexible body 105 of membrane 104 may tend to adhere to adjacent surface 109 under certain conditions. A thin polytetrafluoroethylene (Teflon) sheet or covering 115 is positioned between beads 106 and 108 on the upper surface of body 105 to provide an anti-friction or anti-bonding coating or surface for membrane 104. The forces acting against spindle valve member 70 are balanced as a result of membrane 104 as the effective fluid pressure areas defined by membrane 104 and annular seal 80 are substantially equal for balancing the fluid pressure forces acting on spindle valve member 70 from a positive backpressure in exhaust line 38. Thus, the set relieving pressure at which spindle valve member 70 opens will not be affected by a backpressure in exhaust line 38.

Membrane 104 is installed so that it is in a neutral or unstretched position when spindle valve member 70 is in the open position shown in FIG. 5. When membrane 104 and spindle valve member 70 move from the open position of FIG. 5 to the closed reseated position of FIG. 3, membrane 104 is slightly stretched. As a result, any friction forces applied against spindle valve member 70 are practically zero. As shown in FIG. 4, membrane 104 conforms against the adjacent beveled surface 103 and planar surface 109 upon a backpressure in exhaust line 38 prior to opening of spindle valve member 70 and the effective fluid pressure area is essentially the outside diameter of spindle 87 above membrane 104. The effective fluid pressure area may be altered to optimize the balance with annular seal 80. The material for membrane 104 may be a flexible metallic, elastomeric or thermoplastic material. One material which has been found to be satisfactory is polytetrafluoroethylene (Teflon) material which does not adhere or cold vulcanize to spindle 87 to create any resistance to upward movement of spindle valve member 70 during the relieving or reclosing action. It is essential that the relieving fluid pressure remain within the specified tolerance for the pilot valve.

Operation

In operation, an increase in fluid pressure in pressure vessel 10 above a predetermined set temperature at which pilot valve 32 is set, causes upward movement of valve member 56 to effect upward movement of rod 68 into contact with spindle valve member 70 for unseating of spindle valve member 70 from sealing engagement with sealing member 80. Unseating of spindle valve member 70 to the position shown in FIG. 5 results in fluid communication of intermediate fluid chamber 52 with exhaust fluid chamber 54 for the exhaust of fluid from line 36 and dome chamber 30 through exhaust chamber 54 and exhaust line 38. A reduction of fluid pressure in dome chamber 30 acting against piston actuator 26 results in the opening of main valve member 26 for relief of the fluid pressure from pressure vessel or tank 10. Upon relief of the excess fluid pressure, spindle valve member 70 reseats on annular seal 80 to block fluid communication between exhaust line 38 and intermediate fluid chamber 52. Valve member 56 moves downwardly from seated engagement on seat 66 into contact with cage 60. During downward movement of valve member 56 after seal 64 disengages seat 66, inlet fluid chamber 48 is in communication with intermediate fluid chamber 52 to provide fluid pressure to dome chamber 30 thereby to increase the fluid pressure acting against piston actuator 28 for reclosing of main valve member 26.

Any positive backpressure in exhaust line 38 and exhaust chamber 54 does not affect the opening and slightly alters the reclosing of spindle valve member 70 as the arrangement of membrane 104 and annular seal 80 provide a balanced pressure action against spindle valve member 70. Membrane 104 eliminates any friction forces acting against spindle valve member 70 during movement of valve member 70 between open and closed positions such as frictional forces that would be generated if an annular o-ring were positioned between spindle 87 and the adjacent retainer sleeve 94. For further details of the operation of the pressure relief system of the present invention, reference is made to the aforementioned U.S. Pat. No. 3,664,362 dated May 23, 1972, the entire disclosure being incorporated by this reference.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A pilot valve arranged for controlling the opening of a main valve member at a predetermined high set pressure and the reclosing of the main valve member at a predetermined lower pressure; said pilot valve comprising:

a body having three ports in communication with a bore through said body to define a fluid inlet sensing port, a dome port, and an exhaust port;

said body having a fluid inlet sensing chamber in fluid communication with said fluid inlet port, an intermediate fluid chamber in fluid communication with said dome port, and an exhaust fluid chamber in fluid communication with said exhaust port;

a first valve member between said inlet port and said dome port permitting fluid flow between said inlet sensing chamber and said intermediate chamber in one position and blocking fluid flow between said inlet sensing chamber and said intermediate chamber in another position;

a second valve member positioned between said intermediate fluid chamber and said exhaust chamber normally mounted in a closed position to prevent communication between said intermediate chamber and said exhaust chamber, and movable to an open position to permit fluid communication between said intermediate chamber and said exhaust chamber upon opening thereof at a predetermined high set pressure so that fluid pressure in said intermediate chamber is exhausted through said exhaust port when said second valve member is in an open position;

an annular seal on which said second valve member is seated in a closed position during normal operation to block fluid flow between said exhaust chamber and said intermediate chamber;

a mounting structure for said second valve member positioned within said body bore and mounting said second valve member for movement between closed and open positions; and a conformable annular sealing member for sealing between said second valve member and said mounting structure extending about said second valve member and exposed to fluid pressure from said exhaust port for sealing about said second valve member, said conformable sealing member being attached about its inner periphery within an annular groove extending about said second valve member and attached about its outer periphery to said mounting structure to form the sole sealing member between said second valve member and said mounting structure.

2. A pilot valve as defined in claim 1 wherein said conformable annular sealing member comprises a elastomeric membrane having a relatively thin pliable body.

3. The pilot valve as defined in claim 1 wherein said conformable annular sealing member comprises a thermoplastic membrane having a relatively thin flexible body.

4. The pilot valve as defined in claim 1 wherein said conformable annular member comprises a metallic membrane having a relatively thin flexible body.

5. The pilot valve as defined in claim 1 wherein said annular sealing membrane comprises a relatively thin body having an outer marginal portion and an inner marginal portion, said second valve member being attached to said inner marginal portion and said outer marginal portion being attached to said mounting structure.

6. The pilot valve as defined in claim 5 wherein said second valve member has an annular groove thereabout and said inner marginal portion of said sealing member is received therein in sealing relation.

7. The pilot valve as defined in claim 5 wherein said mounting structure includes a pair of adjacent mounting members and said outer marginal portion of said sealing member is secured between said mounting members.

8. The pilot valve as defined in claim 1 wherein said second valve member includes a spindle and said conformable annular sealing member extends about said spindle.

9. In a pressure relief system for a pressure vessel including a main safety relief valve having a main valve member in fluid communication with the pressure vessel and piston actuator for the main valve member; a pilot valve for controlling the opening of the main valve member at a predetermined high set pressure and the reclosing of the main valve member at a predetermined lower pressure; said pilot valve comprising:

a body having three ports in communication with a bore through said body to define a fluid inlet sensing port, a dome port in fluid communication with the piston actuator, and an exhaust port;

said body having a fluid inlet sensing chamber in fluid communication with said fluid inlet port, an intermediate dome fluid chamber in fluid communication with said dome port, and an exhaust fluid chamber in fluid communication with said exhaust port;

a first valve member between said inlet port and said dome port permitting fluid flow between said inlet sensing chamber and said intermediate chamber in one position and preventing fluid flow between said inlet sensing chamber and said dome chamber in another position;

a second valve member positioned between said intermediate fluid chamber and said exhaust chamber normally mounted in a closed position to prevent communication between said intermediate chamber and said exhaust chamber, and movable to an open position to permit fluid communication between said intermediate chamber and said exhaust chamber at a predetermined high set pressure so that fluid pressure in said intermediate chamber is exhausted through said exhaust port when said second valve member is in an open position; said second valve member including an upper spindle mounted for movement within a bore of a retainer member about said spindle;

an annular seal on which said second valve member is seated in a closed position during normal operation to block fluid flow between said exhaust chamber and said intermediate chamber; and a conformable annular sealing member between said retainer member and said spindle for sealing between the spindle and the retainer member;

said conformable sealing member forming the sole sealing member between said spindle and said retainer member and having an inner periphery freely attached within an annular groove extending about said spindle, said spindle permitting a relatively small movement of said inner periphery transversely of the longitudinal axis of said spindle.

10. The pressure relief system as defined in claim 9 wherein said conformable annular sealing member is unstretched in the fully open position of said second valve member and is slightly stretched in said closed position, said sealing member generating no substantial frictional force between said spindle and said retainer member during movement of said second valve member between open and closed positions.

11. The pressure relief system as defined in claim 9 wherein said conformable annular sealing member comprises an elastomeric membrane having a relatively thin pliable body.

12. The pressure relief system as defined in claim 9 wherein said conformable annular sealing member comprises a thermoplastic membrane having a relatively thin flexible body.

13. The pressure relief system as defined in claim 9 wherein said conformable annular member comprises a metallic membrane having a relatively thin flexible body.

14. The pressure relief system as defined in one of claims 11–13 in which an annular bead is provided along the outer periphery of said membrane.

15. The pressure relief system as defined in one of claims 11–13 in which an annular bead is provide along the inner periphery of said membrane.

16. The pressure relief system as defined in claim 9 wherein said conformable annular sealing member comprises a membrane having a relatively thin flexible body, an annular bead along an inner periphery of said body, and an annular bead along an outer periphery of said body.

17. The pressure relief system as defined in claim 16 wherein said second valve member has an annular groove thereabout and said bead of said inner periphery of said sealing member is received therein.

18. The pressure relief system as defined in claim 16 further comprising:

a mounting structure for said second valve member including a cage about said second valve member and a retainer member adjacent said cage; said bead along said outer periphery of said body being secured between said cage and said retainer member.

19. The pressure relief system as defined in claim 9 wherein said second valve member has an annular groove thereabout and said sealing member has an inner marginal portion received within said annular groove in sealing relation.

20. A pilot valve arranged for controlling the opening of a main valve member at a predetermined high set pressure and the reclosing of the main valve member at a predetermined lower pressure; said pilot valve comprising:

a body having three ports in communication with a bore through said body to define a fluid inlet sensing port, a dome port, and an exhaust port;

said body having a fluid inlet sensing chamber in fluid communication with said fluid inlet port, an intermediate fluid chamber in fluid communication with said dome port, and an exhaust fluid chamber in fluid communication with said exhaust port;

a first valve member between said inlet port and said dome port permitting fluid flow between said inlet sensing chamber and said intermediate chamber in one position and blocking fluid flow between said inlet sensing chamber and said intermediate chamber in another position;

a second valve member positioned between said intermediate fluid chamber and said exhaust chamber normally mounted in a closed position to prevent communication between said intermediate chamber and said exhaust chamber, and movable to an open position to permit fluid communication between said intermediate chamber and said exhaust chamber upon opening thereof at a predetermined high set pressure so that fluid pressure in said intermediate chamber is exhausted through said exhaust port when said second valve member is in an open position;

an annular seal on which said second valve member is seated in a closed position during normal operation to block fluid flow between said exhaust chamber and said intermediate chamber;

a mounting structure for said second valve member positioned within said body bore and mounting said second valve member for movement between closed and open positions;

a conformable annular sealing member for sealing between said second valve member and said mounting structure extending about said second valve member and exposed to fluid pressure from said exhaust port for sealing about said second valve member, said conformable sealing member being attached about its inner periphery to said second valve member and attached about its outer periphery to said mounting structure, said conformable sealing member comprising an elastomeric membrane having a relatively thin pliable body; and a bead is provided along said inner periphery or said outer periphery of said sealing member.

21. A pilot valve arranged for controlling the opening of a main valve member at a predetermined high set pressure and the reclosing of the main valve member at a predetermined lower pressure; said pilot valve comprising:

a body having three ports in communication with a bore through said body to define a fluid inlet sensing port, a dome port, and an exhaust port;

said body having a fluid inlet sensing chamber in fluid communication with said fluid inlet port, an intermediate fluid chamber in fluid communication with said dome port, and an exhaust fluid chamber in fluid communication with said exhaust port;

a first valve member between said inlet port and said dome port permitting fluid flow between said inlet sensing chamber and said intermediate chamber in one position and blocking fluid flow between said inlet sensing chamber and said intermediate chamber in another position;

a second valve member positioned between said intermediate fluid chamber and said exhaust chamber normally mounted in a closed position to prevent communication between said intermediate chamber and said exhaust chamber, and movable to an open position to permit fluid communication between said intermediate chamber and said exhaust chamber upon opening thereof at a predetermined high set pressure so that fluid pressure in said intermediate chamber is exhausted through said exhaust port when said second valve member is in an open position;

an annular seal on which said second valve member is seated in a closed position during normal operation to block fluid flow between said exhaust chamber and said intermediate chamber;

a mounting structure for said second valve member positioned within said body bore and mounting said second valve member for movement between closed and open positions;

a conformable annular sealing member for sealing between said second valve member and said mounting structure extending about said second valve member and exposed to fluid pressure from said exhaust port for sealing about said second valve member, said conformable sealing member being attached about its inner periphery to said second valve member and attached about its outer periphery to said mounting structure, said conformable sealing member comprising a thermoplastic membrane having a relatively thin flexible body; and a bead is provided along said inner periphery or said outer periphery of said sealing member.

22. A pilot valve arranged for controlling the opening of a main valve member at a predetermined high set pressure and the reclosing of the main valve member at a predetermined lower pressure; said pilot valve comprising:

a body having three ports in communication with a bore through said body to define a fluid inlet sensing port, a dome port, and an exhaust port;

said body having a fluid inlet sensing chamber in fluid communication with said fluid inlet port, an intermediate fluid chamber in fluid communication with said dome port, and an exhaust fluid chamber in fluid communication with said exhaust port;

a first valve member between said inlet port and said dome port permitting fluid flow between said inlet sensing chamber and said intermediate chamber in one position and blocking fluid flow between said inlet sensing chamber and said intermediate chamber in another position;

a second valve member positioned between said intermediate fluid chamber and said exhaust chamber normally mounted in a closed position to prevent communication between said intermediate chamber and said exhaust chamber, and movable to an open position to permit fluid communication between said intermediate chamber and said exhaust chamber upon opening thereof at a predetermined high set pressure so that fluid pressure in said intermediate chamber is exhausted through said exhaust port when said second valve member is in an open position;

an annular seal on which said second valve member is seated in a closed position during normal operation to block fluid flow between said exhaust chamber and said intermediate chamber;

a mounting structure for said second valve member positioned within said body bore and mounting said second valve member for movement between closed and open positions;

a conformable annular sealing member for sealing between said second valve member and said mounting structure extending about said second valve member and exposed to fluid pressure from said exhaust port for sealing about said second valve member, said conformable sealing member being attached about its inner periphery to said second valve member and attached about its outer periphery to said mounting structure, said conformable sealing member comprising a metallic membrane having a relatively thin flexible body; and a bead is provided along said inner periphery or said outer periphery of said sealing member.

23. A pilot valve arranged for controlling the opening of a main valve member at a predetermined high set pressure and the reclosing of the main valve member at a predetermined lower pressure; said pilot valve comprising:

a body having three ports in communication with a bore through said body to define a fluid inlet sensing port, a dome port, and an exhaust port;

said body having a fluid inlet sensing chamber in fluid communication with said fluid inlet port, an intermediate fluid chamber in fluid communication with said dome port, and an exhaust fluid chamber in fluid communication with said exhaust port;

a first valve member between said inlet port and said dome port permitting fluid flow between said inlet sensing chamber and said intermediate chamber in one position and blocking fluid flow between said inlet sensing chamber and said intermediate chamber in another position;

a second valve member positioned between said intermediate fluid chamber and said exhaust chamber normally mounted in a closed position to prevent communication between said intermediate chamber and said exhaust chamber, and movable to an open position to permit fluid communication between said intermediate chamber and said exhaust chamber upon opening thereof at a predetermined high set pressure so that fluid pressure in said intermediate chamber is exhausted through said exhaust port when said second valve member is in an open position;

an annular seal on which said second valve member is seated in a closed position during normal operation to block fluid flow between said exhaust chamber and said intermediate chamber;

a mounting structure for said second valve member positioned within said body bore and mounting said second valve member for movement between closed and open positions;

a conformable annular sealing member for sealing between said second valve member and said mounting structure extending about said second valve member and exposed to fluid pressure from said exhaust port for sealing about said second valve member, said conformable sealing member being attached about its inner periphery to said second valve member and attached about its outer periphery to said mounting structure, said conformable sealing member comprising a membrane having a relatively thin flexible body; and a bead is provided along said inner periphery and said outer periphery of said body.

24. The pilot valve as defined in claim 23 wherein said second valve member has an annular groove thereabout and said bead of said inner periphery of said sealing member is received therein.

25. The pilot valve as defined in claim 23 wherein said mounting structure for said second valve member includes a cage about said second valve member and a retainer member adjacent said cage; said bead along said outer periphery of said member being gripped between said cage and said retainer member.

\* \* \* \* \*